US010444512B2

(12) United States Patent
Wang et al.

(10) Patent No.: US 10,444,512 B2
(45) Date of Patent: Oct. 15, 2019

(54) OPTICAL CHARACTERIZATION SYSTEM FOR LENSES

(71) Applicant: Facebook Technologies, LLC, Menlo Park, CA (US)

(72) Inventors: Daozhi Wang, Dublin, CA (US); Ning Yeung Chan, Palo Alto, CA (US); Youngshik Yoon, Cupertino, CA (US); Shizhe Shen, San Mateo, CA (US); Torin Ross Herndon, Palo Alto, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 124 days.

(21) Appl. No.: 15/866,155

(22) Filed: Jan. 9, 2018

(65) Prior Publication Data

US 2018/0246332 A1    Aug. 30, 2018

Related U.S. Application Data

(60) Provisional application No. 62/464,255, filed on Feb. 27, 2017.

(51) Int. Cl.
    G02B 27/01     (2006.01)
    H05B 33/08     (2006.01)
    G02B 27/00     (2006.01)
    G01M 11/02     (2006.01)

(52) U.S. Cl.
    CPC ..... G02B 27/0172 (2013.01); G01M 11/0264 (2013.01); G02B 27/0025 (2013.01); H05B 33/0803 (2013.01)

(58) Field of Classification Search
    CPC ............ G02B 27/0025; G02B 27/0172; H05B 33/0803; G01M 11/0264
    USPC .................................................. 356/124–137
    See application file for complete search history.

(56) References Cited

U.S. PATENT DOCUMENTS 5,331,394 A * 7/1994 Shalon ............... G01M 11/0235
                                                   356/124

\* cited by examiner

*Primary Examiner* — Tri T Ton
(74) *Attorney, Agent, or Firm* — Fenwick & West LLP (57) ABSTRACT

An optical characterization system tests optical elements of head-mounted displays (HMD) such as lenses. The system emits a test pattern of light through an aperture of a hollow truncated cone. The hollow truncated cone may be rotated to different angles of test positions, for example, to mimic rotation of a human eye of a user wearing an HMD. The emitted light is refracted by a test lens and captured by a detector assembly. Using images captured by the detector assembly, the system determines one or more quality metrics of the test lens. Quality metrics may describe various types of optical aberrations, which may be determined as a function of the test positions (e.g., angle and/or position of the hollow truncated cone relative to the test lens). In addition, the system may generate an optical profile of the test lens using the quality metrics.

20 Claims, 5 Drawing Sheets

OPTICAL CHARACTERIZATION SYSTEM FOR LENSES

CROSS REFERENCE TO RELATED APPLICATION

This application claims the benefit of priority to U.S. Provisional Application No. 62/464,255, filed on Feb. 27, 2017, which is incorporated herein in its entirety for all purposes.

BACKGROUND

The disclosure relates generally to testing optical components, and specifically to a system for optically characterizing an optical element as a function of angle.

Optical aberrations due to optics in an HMD can negatively impact images presented on an electronic display of the HMD, and thereby negatively impact a visual experience a user wearing the HMD. Optical aberration may increase as, e.g., light moves off axis from optical elements within the HMD. Conventional systems may measure aberration of an optical element, however, such systems are not optimized to measure aberration of optical elements used in HMDs.

SUMMARY

An optical characterization system ("system") characterizes optical elements. In an embodiment, the system includes a lens holder assembly that holds a test lens. The system further includes a cone assembly positioned at a first side of the lens holder assembly. The cone assembly includes a hollow truncated cone including at least a first aperture, and a light source configured to emit light through the first aperture such that the test lens refracts the emitted light. The system further includes a detector assembly positioned at a second side of the lens holder assembly. The detector assembly is configured to capture images by detecting the refracted light. The system further includes a controller configured to determine one or more quality metrics of the test lens using the captured images.

In another embodiment, a method includes receiving a test lens coupled to a lens holder assembly. The method further includes generating, by a controller, calibration instructions describing a plurality of test positions of a cone assembly. The method further includes, for each of the plurality of test positions, positioning the cone assembly according to the test position; illuminating, by a light source of the cone assembly, the test lens; and capturing, by a detector assembly, images using light from the light source refracted by the test lens. The method further includes determining, by the controller using the captured images, one or more quality metrics of the test lens as a function of the plurality of test positions.

In another embodiment, a non-transitory computer-readable storage medium stores instructions that when executed by a processor causes the processor to execute the above-described method.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a 3D effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 1:
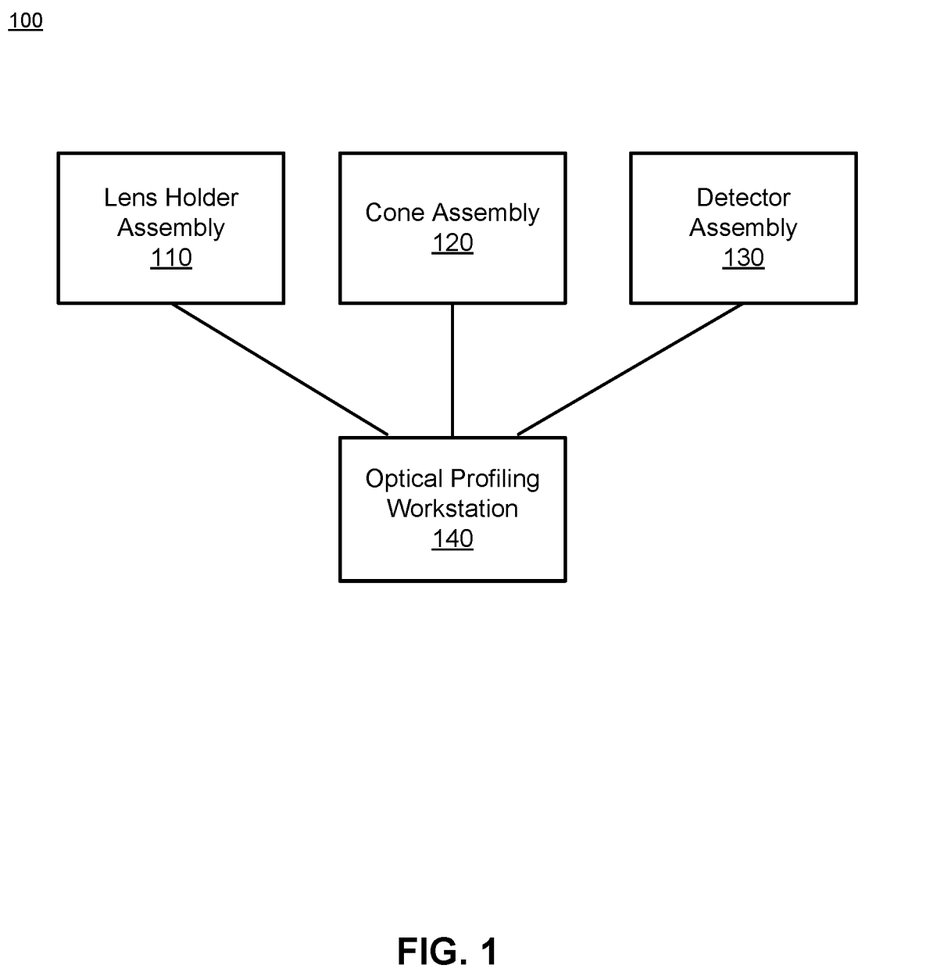
FIG. 1 is a system block diagram of an optical characterization system, in accordance with an embodiment.

FIG. 1 is a system block diagram of an optical characterization system 100, in accordance with an embodiment. The optical characterization system 100 characterizes optical aberration in lenses or other types of optical elements. Characterization of the optical aberration includes, e.g., generating as a function of position (e.g., translational position and/or angle of orientation) one or more quality metrics of a lens under test. In FIG. 1A, the optical characterization system 100 includes a lens holder assembly 110, a cone assembly 120, a detector assembly 130, and an optical profiling workstation 140. FIG. 1A shows merely one example and in alternative embodiments not shown, additional and/or different entities can be included in the optical characterization system 100. Likewise, functions performed by different entities in the optical characterization system 100 may differ in different embodiments.

The lens holder assembly 110 holds a test viewing optic (e.g., a test lens). The optical characterization system 100 measures optical aberrations of the test viewing optic. The lens holder assembly 110 is positioned between the cone assembly 120 and the detector assembly 130. The lens holder assembly 110 couples the lens to a mounting area via a coupling assembly. The coupling assembly holds the test lens to the mounting area. The coupling assembly may include, e.g., tabs, screws, mechanical arms, some other assembly that is configured to hold an optical element in position, or some combination thereof. In some embodiments, the test lens held by the lens holder assembly 110 is fixed in place at the mounting area. In alternate embodiments, the lens holder assembly 110 may be configured to adjust a position and/or orientation of the test lens by a certain number of degrees of freedom, for example, one degree of freedom, two degrees of freedom, three degrees of freedom, four degrees of freedom, five degrees of freedom, or six degrees of freedom, etc. For example, the mounting area may be affixed to a mechanical stage that has up to six degrees of freedom. The mounting area includes an aperture to allow light incident on one side of the test lens to pass through (and be refracted by the test lens) the test lens and through the aperture toward the detector assembly 130.

The cone assembly 120 mimics a human eye positioned in an eyebox of a head-mounted display (HMD). The cone assembly 120 includes a light source, a hollow truncated cone, and a positioning device. The light source emits a test pattern (e.g., a grid, checkerboard pattern, etc.) in accordance with calibration instructions. In some embodiments, the light source is monochromatic. In alternate embodiments, the light source is a multi-channel light source that provides the test pattern. A multi-channel light source is a light source that can emit light over a plurality of different wavelength channels. The channels may include, e.g., red light, green light, blue light, near infrared light, some other band of light, or some combination thereof. The test pattern is light emitted from the light source for measurement of one or more quality metrics of the test lens. The light source includes one or more light sources. In one embodiment, the one or more light sources can be halogen light, light emitting diodes (LEDs), lasers, tunable lasers, a liquid crystal display (LCD), an organic light emitting diode (OLED) display, an inorganic light emitting diode (ILED) display, an active-matrix organic light-emitting diode (AMOLED) display, some other display, a projector, or some combination thereof. The light source is configured to emit light over a range of wavelengths based on wavelength channel information (e.g., in calibration instructions).

The hollow truncated cone funnels light toward the test lens. The hollow truncated cone includes an apex aperture, a base aperture, and an exterior surface. The hollow truncated cone is cone shaped, but has its tip removed to form the apex aperture. In alternate embodiments, the hollow truncated cone may have some other shape. For example—the hollow truncated cone may be shaped as a truncated frustum (e.g., pentagonal, square, etc.). The apex aperture is sized to mimic a pupil of a human eye (e.g., ~2-7 millimeters (mm)). In some embodiments, the apex aperture has a fixed aperture size (e.g., 5 mm). In alternate embodiments, the apex aperture may dynamically adjust the size of the apex aperture. For example, the apex aperture may include an iris diaphragm that would allow adjustment of the apex aperture size. In some embodiments, the size of the apex aperture may be dynamically controlled (e.g., in accordance with the calibration instructions by the optical profiling workstation 140). Alternatively, the size may be manually adjusted by a user of the optical characterization system 100.

The base aperture is located opposite to the apex aperture in the hollow truncated cone. The base aperture is an aperture that receives the test pattern from the light source. In some embodiments, the base aperture has a fixed aperture size. In alternate embodiments, the base aperture may dynamically adjust the size of the base aperture. For example, the base aperture may include an iris diaphragm that would allow adjustment of the base aperture size. In some embodiments, the size of the base aperture may be dynamically controlled (e.g., in accordance with the calibration instructions by the optical profiling workstation 140). Alternatively, the size may be manually adjusted by the user of the optical characterization system 100. In some embodiments, the base aperture may couple or attach to the light source—such that the hollow truncated cone and the light source move together as a unit.

The exterior surface of the hollow truncated cone couples the base aperture to the apex aperture. The exterior surface has a variable thickness that tapers from the base aperture to the apex aperture to form the hollow truncated cone. The exterior surface encloses an interior channel that funnels the test pattern from the base aperture to the apex aperture. In some embodiments, the interior channel includes a plurality of steps (e.g., illustrated in FIGS. 2B and 2C). The steps act as baffles to help reduce stray light in the system. Additionally, in some embodiments, the interior channel is coated (e.g., with matte black paint) to further absorb stray light.

The hollow truncated cone includes a reference point that is positioned at a location relative to the apex aperture to mimic rotation of a human eye. Accordingly, rotational movement of the hollow truncated cone around the reference point occurs in a manner similar to movement of a human eye whose rotation point is located at the reference point of the hollow truncated cone. Further, the rotational movement mimics movement of a human eye of a user wearing an HMD and viewing content displayed by an electronic display of the HMD. An advantage of such a configuration is that the optical characterization system 100 may characterize one or more quality metrics of the test lens as a function of angle, where the angle corresponds to gaze angle of a human eye. In some embodiments, the reference point is ~12 mm from a center of the apex aperture. This distance approximates a distance from a pupil in an adult human eye to a point of rotation in the human eye.

The positioning device positions the hollow truncated cone relative to a test lens in accordance with the calibration instructions. The positioning device may adjust the position of the hollow truncated cone with up to six degrees of freedom. For example, the positioning device may position the apex aperture at a distance relative to the test lens to replicate an eye relief distance in an HMD. The positioning device may also rotate the hollow cone assembly about its reference point to simulate different gaze angles. In some embodiments, the positioning device is configured to dynamically vary the position of the reference point relative to the apex aperture. For example, the positioning device may rotate the hollow cone assembly in a manner such that the reference point is at a new location. For example, the reference point may be adjusted to be closer to the apex aperture to approximate a distance from a pupil in a child's eye to a point of rotation in the child's eye.

The detector assembly 130 detects a test pattern emitted by the light source and refracted though the test lens. The detector assembly 130 includes one or more detectors and a positioning stage. A detector may be, e.g., an array (1D or 2D) of photodiodes, charge coupled display (CCD) array, some other device capable of detecting light emitted from the light source in the cone assembly 120, or some combination thereof. The one or more detectors can capture one or more images that result from the test pattern that has passed through the test lens. The one or more detectors are sensitive in the wavelength emitted by the one or more light sources. The one or more detectors are mounted to the positioning stage. In some embodiments, the positioning stage is moveable to capture light refracted by the test lens over a range of different angles. In addition, the optical characterization system 100 may coordinate positioning of the positioning stage of the detector assembly 130 and the positioning device of the hollow truncated cone. In some embodiments, the positioning device translates and/or rotates the hollow truncated cone to a particular gaze angle, and the positioning stage translates and/or rotates the detector assembly 130 to an angle corresponding to the gaze angle (e.g., the same angle but rotated in an opposite direction, and/or the angle modified by an offset or scaling factor). Thus, the detector assembly 130 may be aligned with the hollow truncated cone to image a test pattern emitted from the light source and through the apex aperture of the hollow truncated cone.

The optical profiling workstation 140 is a computer that controls components in the optical characterization system 100. In more detail, the optical profiling workstation 140 receives input parameters. Input parameters are used to control the characterization process of the test lens. Input parameters may include, e.g., eye relief, pupil size, source wavelength, test pattern type (e.g., grid, checkerboard, resolution pattern, etc.), gaze angle, off-axis position, number of measurements per position, optical metric (e.g., modulation transfer function, astigmatism, distortion, etc.) for test, test lens data (e.g., radius of curvature, focal length, index of refraction, etc.), frame capture rate, information to position the one or more detectors in the detector assembly 130, some other parameter that controls the characterization of the test lens, or some combination thereof. The optical profiling workstation 140 generates calibration instructions using one or more of the input parameters. The calibration instructions control operation of the cone assembly 120 and the detector assembly 130. The optical profiling workstation 140 processes one or more input parameters such that they can be provided to the cone assembly 120 and/or the detector assembly 130.

The optical profiling workstation 140 analyzes information to determine optical aberration or other quality metrics of the test lens. The optical profiling workstation 140 receives one or more images captured by one or more detectors in the detector assembly 130, and analyzes the captured one or more images to generate an optical profile for describing quality metrics (e.g., amount of optical aberration) of the test lens. Quality metrics are metrics used by the optical characterization system 100 to determine qualities of the test lens as a function of angle and/or position, and example quality metrics can include: lateral chromatic aberration, astigmatism, distortion, modular transfer function (MTF), etc. Note that captured images are based on position and/or angle of orientation of the cone assembly that mimic a human eye. Accordingly, the quality metrics are in effect functions of gaze angle as well as eye location in an eye box of the HMD. Eye location in the eye box is indicative of, e.g., eye relief as well as position relative to an optical axis of the test lens (i.e., what happens when the eye is centered off-axis). In some embodiments, the optical profiling workstation 140 generates a report including the optical profile of the test lens. In some embodiments, the report may compare one or more quality metrics to design data of the test lens (e.g., provided by a manufacturer of the test lens). And the report may flag (e.g., highlight) any quality metrics that are out of specification. The report may be provided (e.g., via a monitor) to a user of the optical profiling workstation 140.

Figure 2A:
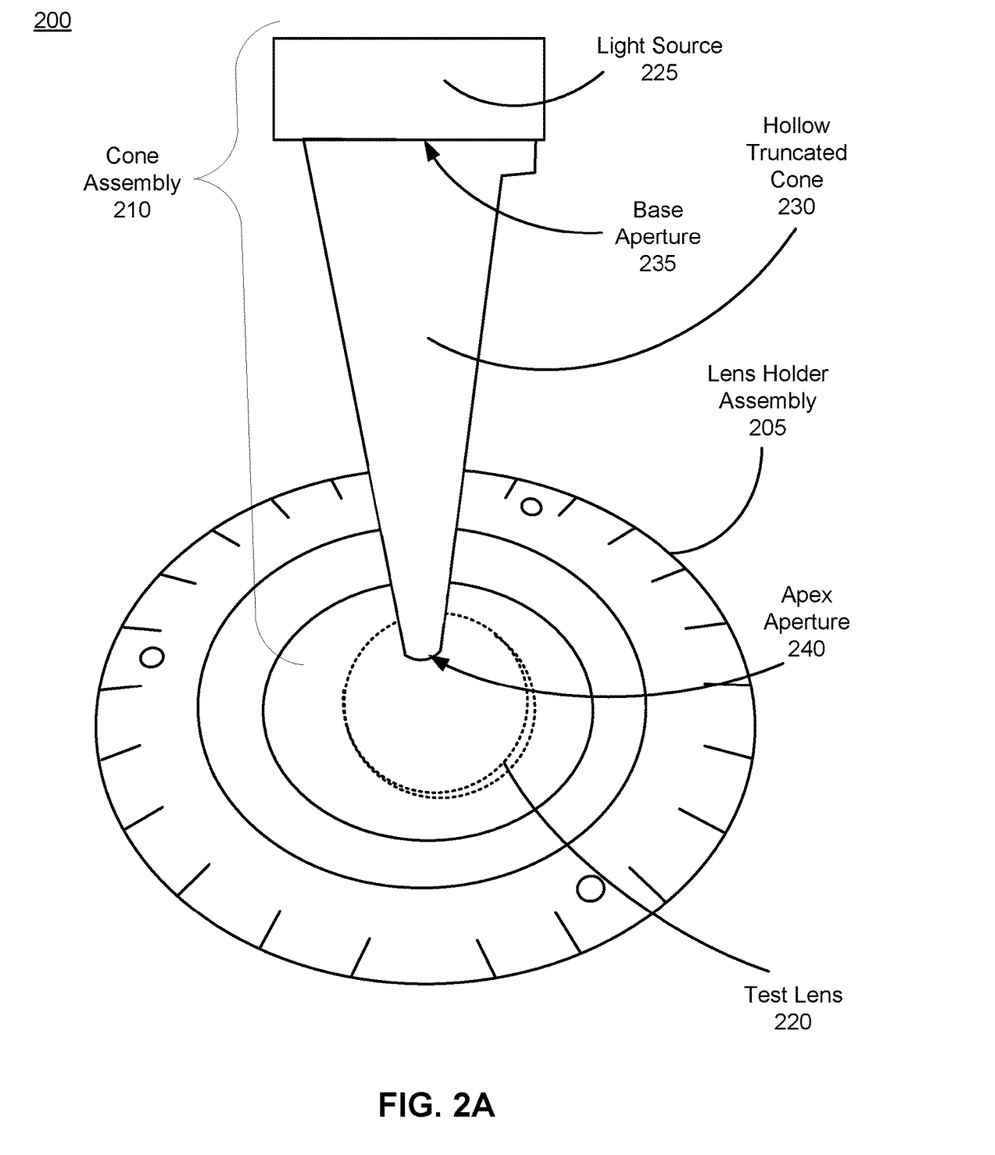
FIG. 2A is a perspective view of an optical characterization system, in accordance with an embodiment.

FIG. 2A is a perspective view of an optical characterization system 200, in accordance with an embodiment. In some embodiments, the optical characterization system 200 is an embodiment of the optical characterization system 100.

Figure 2B:
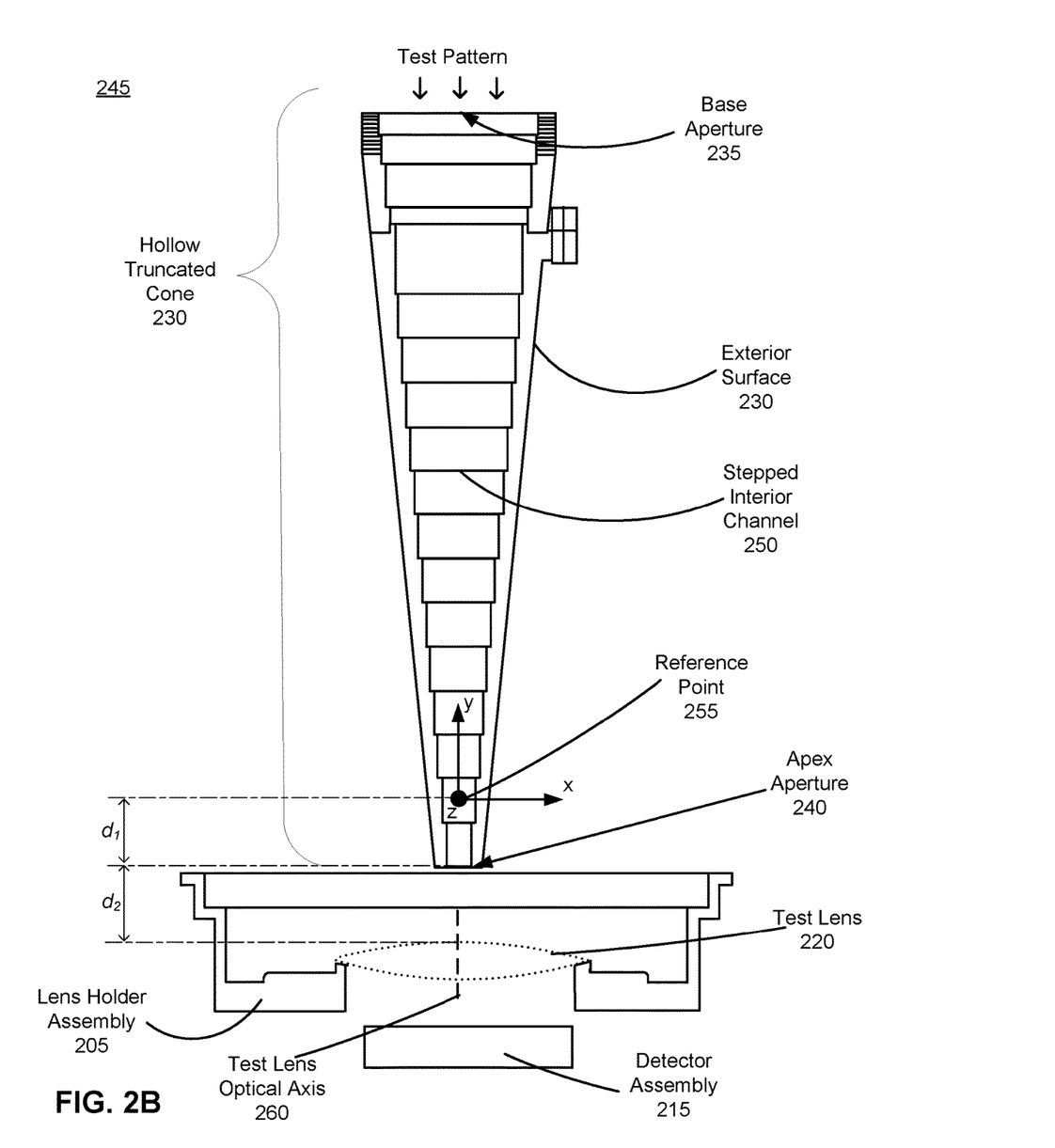
FIG. 2B is a cross section of a portion of the optical characterization system shown in FIG. 2A, in accordance with an embodiment.

The characterization system 200 includes a lens holder assembly 205, a cone assembly 210, and a detector assembly 215 (visible in FIG. 2B).

The lens holder assembly 205 holds a test lens 220. In one embodiment, the lens holder assembly 205 has one or more adjustable degrees of freedom that allows the test lens 220 to be rotated and/or translated.

The cone assembly 210 mimics a human eye positioned in an eyebox of a head-mounted display (HMD). The cone assembly 210 includes a light source 225, a hollow truncated cone 230, and a positioning device (not illustrated for simplicity). In the embodiment shown in FIG. 2A, the light source 225 is coupled directly to the hollow truncated cone 230. In alternate embodiments, the light source 225 may be external to cone assembly 210. In an embodiment, the light source 225 is an OLED panel that is configured to display a test pattern in accordance with the calibration instructions. Emitted test light of the test pattern enters the hollow truncated cone 230 via a base aperture 235 and exits the hollow truncated cone 230 via an apex aperture 240. As noted above with regard to FIG. 1, the apex aperture 240 is located at a distance from the test lens 220, and this distance can be equal to, e.g., an eye relief distance in an HMD. The test pattern is then refracted by the test lens 220 and is captured by the detector assembly 215 as shown in FIG. 2B. The detector assembly 215 detects images resulting from test light of the test pattern that was emitted by the light source 225 positioned and/or oriented at one or more test positions of the cone assembly 210.

FIG. 2B is a cross section 245 of a portion of the optical characterization system 200 shown in FIG. 2A, in accordance with an embodiment. The cross section 245 illustrates a stepped interior channel 250 of the hollow truncated cone 230. In this embodiment, there are a plurality of cylindrical sections of progressively smaller radius between the base aperture 235 and the apex aperture 240. Additionally, a reference point 255 is illustrated and its corresponding coordinate system. The reference point 255 is located along an axis (y-axis) that runs axially through the hollow truncated cone 230. As noted above with reference to FIG. 1, the reference point 255 is a point at which the hollow truncated code 230 is rotated. The apex aperture 240 corresponds to a pupil of an eye and the reference point 255 corresponds to a point about which the eye would rotate. The reference point 255 is positioned a distance $d_1$ from the apex aperture 240, where $d_1$ is the distance between a pupil of an eye and a center of rotation of the eye. For an adult human, $d_1$ may be, e.g., ~12 mm. Note that in some embodiments, a location of the reference point 255 may vary based on the calibration instructions.

The apex aperture 240 is positioned a distance $d_2$ from the test lens 220. The distance $d_2$ represents eye relief that a user would have in a HMD. For example, the distance $d_2$ may be 15 mm. In some embodiments, the distance $d_2$ may be varied by a positioning device of the cone assembly 210 and/or the lens holder assembly 205. Additionally, in some embodiments, a location of the apex aperture 240 relative to the test lens 220 may be adjusted in the x, y, and/or z dimensions of the coordinate system via a positioning device of the cone assembly 210 and/or the lens holder assembly 205.

In FIG. 2B, a test pattern from the light source 225 (shown in FIG. 2A) propagates through the stepped interior channel 250 and exits via the apex aperture 240. The test pattern is incident on the test lens 220, which refracts the test pattern. One or more images of the refracted test pattern is captured by detector assembly 215. In an embodiment, the detector assembly 215 is a 2D array of photodiodes. The optical characterization workstation 200 rotates and/or translates the cone assembly 210 and/or the detector assembly 215 to different test positions relative to the test lens 220, and the detector assembly 215 captures images of the test pattern for each of the different test positions. Note that the rotations are about the reference point 255—which is always along an axial axis of the hollow truncated cone 230. Moreover, by translating the reference point 255 relative to a test lens optical axis 260, data can be captured simulating different locations of an eye within an eyebox of an HMD. In this manner, quality metrics can be determined that are also functions of eye position within the eyebox (e.g., how distortion scales with distance from the test lens optical axis 260).

Figure 2C:
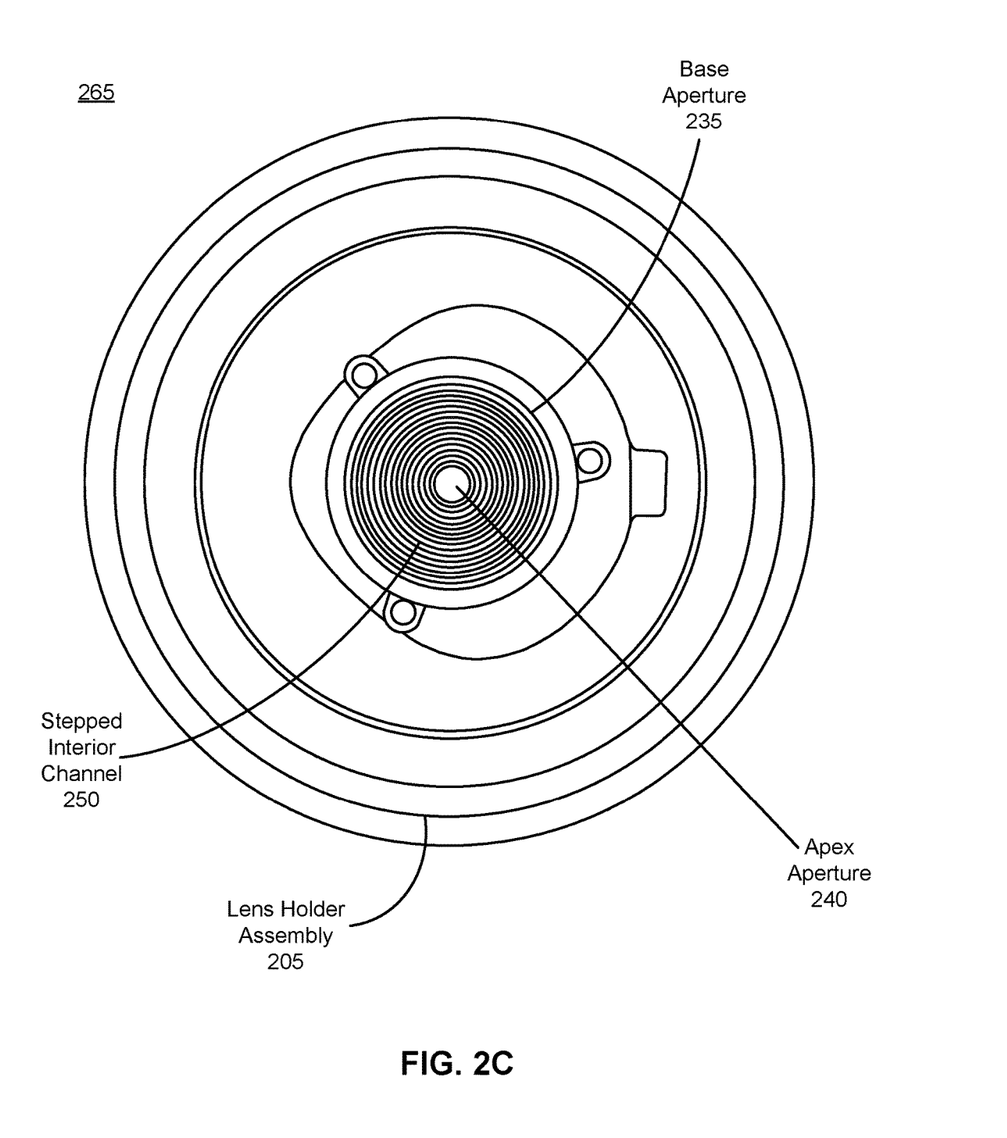
FIG. 2C is a top down view of the portion of the optical characterization system shown in FIG. 2B, in accordance with an embodiment.

FIG. 2C is a top down view 265 of the portion of the optical characterization system 200 shown in FIG. 2B, in accordance with an embodiment. In this embodiment, the steps of the stepped interior channel 250 are visible, as well as the small size of the apex aperture 240 relative to the size of the base aperture 235.

Figure 3:
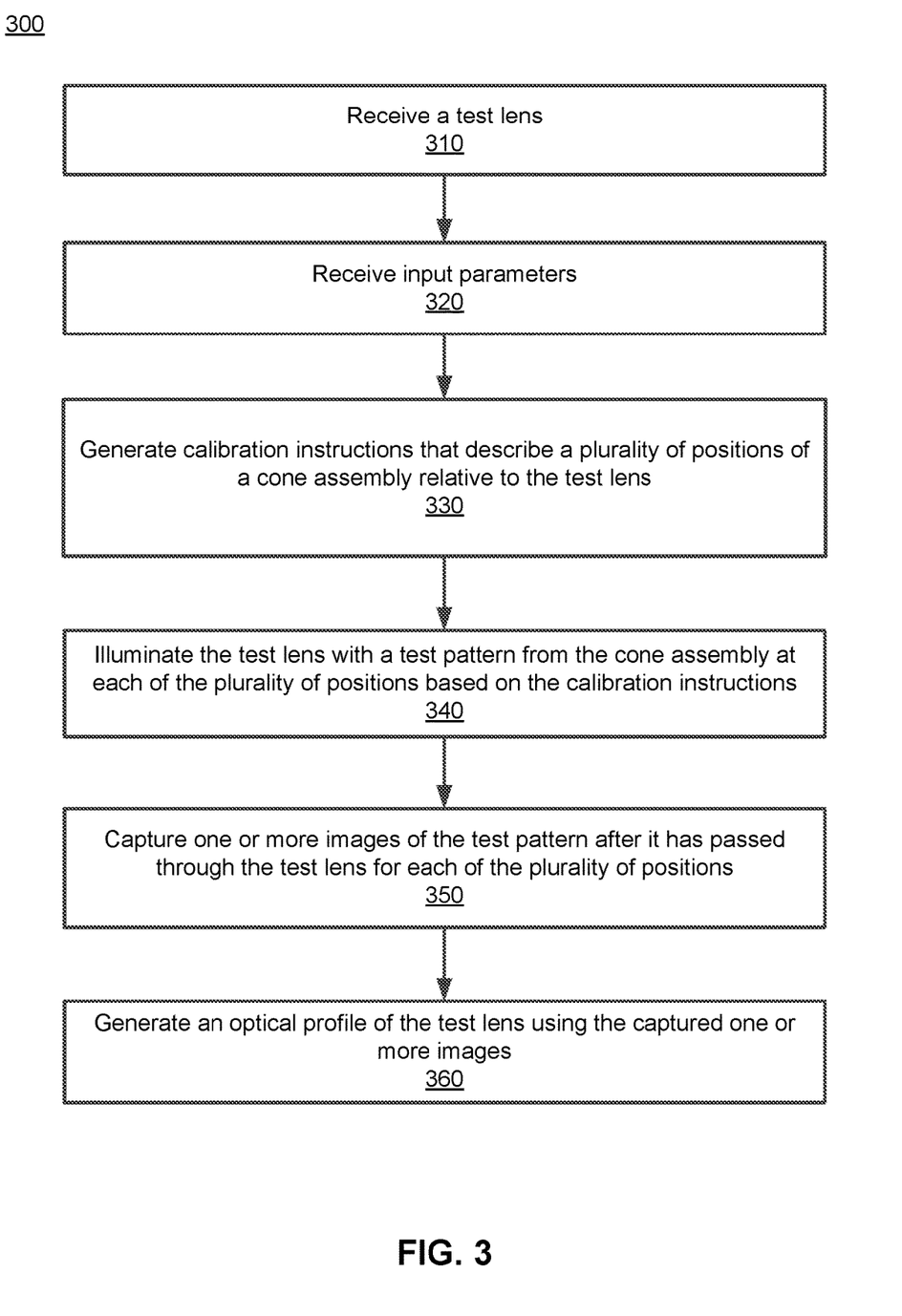
FIG. 3 is a flow chart illustrating a process of generating an optical profile of a test lens, in accordance with an embodiment.

FIG. 3 is a flow chart illustrating a process 300 of generating an optical profile of a test lens, in accordance with an embodiment. In one embodiment, the process 300 of FIG. 3 is performed by the optical characterization system 100. In alternate embodiments, other entities may perform some or all of the steps of the process 300. Likewise, embodiments may include different and/or additional steps, or perform the steps in different orders.

The optical characterization system 100 receives 310 a test lens. In one embodiment, the optical characterization system 100 automatically receives a test lens. In another embodiment, the optical characterization system 100 receives a test lens from a user. The test lens may be coupled to a lens holder assembly (e.g., lens holder assembly 110).

The optical characterization system 100 receives 320 input parameters. The input parameters may be determined by the optical characterization system 100, provided by the user, or some combination thereof.

The optical characterization system 100 generates 330 calibration instructions that describe a plurality of positions of a cone assembly (e.g., the cone assembly 120) relative to the test lens. The optical characterization system 100 generates calibration instructions in accordance with the input parameters. As described above, in one embodiment, the calibration instructions describe a plurality of test positions of the cone assembly that emits a test pattern (e.g., by light source 225), and each of the plurality of test positions may have a different angular direction relative to the test lens. The test positions may correspond to one or more positions and/or orientations of a user's eye in an eyebox of an HMD. The test positions may also correspond to sizes of the apex aperture for testing. For each of the plurality of test positions, the optical characterization system 100 may position the cone assembly (e.g., by translating or rotating the hollow truncated cone 230) according to the test position. Furthermore, the lens holder assembly may position the test lens based on a corresponding angle (and/or position) of the test position, such that the test lens is aligned to the hollow truncated cone 230 (e.g., aligned to the test lens optical axis 260).

The optical characterization system 100 illuminates 340 the test lens with a test pattern from the cone assembly at each of the plurality of positions based on the calibration instructions.

The optical characterization system 100 captures 350 (e.g., via the detector assembly 130) one or more images of the test patterns after light of the test patterns has passed through and/or been refracted by the test lens for each of the plurality of positions.

The optical characterization system 100 generates 360 an optical profile describing the test lens using the captured one or more images. The optical system 100 analyzes the one or more captured images to determine one or more quality metrics (e.g., MTF, astigmatism, distortion, etc.). As noted above, the quality metrics may be a function of angle (e.g., gaze angle) and position (e.g., location of an eye in the eyebox). Additionally, in some embodiments, the optical characterization system 100 may generate a report describing the optical profile and provide it to the user. Additionally, the report may highlight any areas where the test lens does not meet specification.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system comprising:
a lens holder assembly configured to hold a test lens;
a cone assembly that is separate from the lens holder assembly, the cone assembly positioned at a first side of the lens holder assembly, the cone assembly including:
a hollow truncated cone including at least a first aperture;
a light source configured to emit light through the first aperture such that the test lens refracts the emitted light;
a detector assembly positioned at a second side of the lens holder assembly, the detector assembly configured to capture images by detecting the refracted light; and
a controller configured to determine one or more quality metrics of the test lens using the captured images.

2. The system of claim 1, wherein the cone assembly further comprises:
a positioning device configured to translate the hollow truncated cone to a first distance from the test lens, the one or more quality metrics associated with the first distance.

3. The system of claim 2, wherein the positioning device is configured to rotate the hollow truncated cone to an angle about a reference point, the reference point located at a second distance from the first aperture along an axis of the hollow truncated cone, the one or more quality metrics associated with the angle.

4. The system of claim 3, wherein the detector assembly further comprises:
a positioning stage configured to rotate the detector assembly such that the test lens is aligned with the rotated hollow truncated cone.

5. The system of claim 3, wherein the controller is further configured to generate calibration instructions according to input parameters, the calibration instructions indicating a plurality of test positions for the hollow truncated cone including at least the first distance and the angle.

6. The system of claim 3, wherein the one or more quality metrics indicate at least one of aberration, astigmatism, distortion, or modular transfer function of the test lens as a function of the first distance and the angle.

7. The system of claim 3, wherein the first distance is approximately 15 millimeters, and wherein the second distance is approximately 12 millimeters.

8. The system of claim 1, wherein the controller is further configured to generate calibration instructions according to input parameters, the calibration instructions indicating a test pattern for the light emitted by the light source, the test pattern including a grid, checkerboard, or resolution pattern.

9. The system of claim 1, wherein the hollow truncated cone further comprises:
a second aperture greater in size than the first aperture, the light emitted by the light source entering the hollow truncated cone through the second aperture and exiting the hollow truncated cone through the first aperture.

10. The system of claim 9, wherein an interior surface of the hollow truncated cone includes a plurality of steps.

11. The system of claim 1, wherein a size of the first aperture may vary from 2 to 7 millimeters, the hollow truncated cone further configured to adjust the size of the first aperture according to calibration instructions generated by the controller.

12. The system of claim 1, wherein an interior surface of the hollow truncated cone is coated with matte black paint.

13. The system of claim 1, wherein the controller is further configured to generate an optical profile of the test lens using the one or more quality metrics, the optical profile indicating that at least one of the one or more quality metrics is out of specification.

14. A method comprising:
receiving a test lens coupled to a lens holder assembly;
generating, by a controller, calibration instructions describing a plurality of test positions of a cone assembly that is separate from the lens holder assembly;
for each of the plurality of test positions:
positioning the cone assembly according to the test position;
illuminating, by a light source of the cone assembly, the test lens;
capturing, by a detector assembly, images using light from the light source refracted by the test lens; and
determining, by the controller using the captured images, one or more quality metrics of the test lens as a function of the plurality of test positions.

15. The method of claim 14, wherein each of the plurality of test positions indicates an angle, and wherein positioning the cone assembly according to the test position comprises:
rotating a hollow truncated cone of the cone assembly about a reference point to the corresponding angle of the test position.

16. The method of claim 15, further comprising, for each of the plurality of test positions:
positioning, by the lens holder assembly, the test lens based on the corresponding angle of the test position such that the test lens is aligned to the hollow truncated cone.

17. The method of claim 14, wherein illuminating the test lens comprises:
emitting light by the light source through an aperture of a hollow truncated cone of the cone assembly, the lens receiving the emitted light through another aperture of the hollow truncated cone, an interior surface of the hollow truncated cone including a plurality of steps varying in size between the apertures.

18. The method of claim 17, further comprising:
adjusting a size of the aperture of the hollow truncated cone according to the calibration instructions, the size of the aperture ranging from 2 to 7 millimeters.

19. The method of claim 14, further comprising:
generating a test pattern for illuminating the test lens by the light source, the test pattern including a grid, checkerboard, or resolution pattern.

20. The method of claim 14, further comprising:
generating an optical profile of the test lens using the one or more quality metrics, the optical profile indicating that at least one of the one or more quality metrics is out of specification.

* * * * *